US010892622B2

(12) United States Patent
Guruprasad et al.

(10) Patent No.: US 10,892,622 B2
(45) Date of Patent: Jan. 12, 2021

(54) DYNAMIC PHOTOVOLTAIC ADAPTION FOR MANAGING GRID VOLATILITY USING A PHOTOVOLTAIC HARVESTER

(71) Applicant: International Business Machines Corporation, Armonk, NY (US)

(72) Inventors: Ranjini B. Guruprasad, Bangalore (IN); Jagabondhu Hazra, Bangalore (IN); Shivkumar Kalyanaraman, Bangalore (IN); Sukanya Randhawa, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 407 days.

(21) Appl. No.: 15/362,492

(22) Filed: Nov. 28, 2016

(65) Prior Publication Data

US 2018/0152023 A1    May 31, 2018

(51) Int. Cl.
*H02J 1/00* (2006.01)
*H02J 3/00* (2006.01)
(Continued)

(52) U.S. Cl.
CPC ............. *H02J 3/385* (2013.01); *H02J 3/46* (2013.01); *H02S 20/32* (2014.12); *H02S 40/22* (2014.12); *H02S 50/00* (2013.01); *Y02E 10/56* (2013.01)

(58) Field of Classification Search
CPC .. H02J 3/385; H02J 3/46; H02S 20/32; H02S 50/00; H02S 40/22; Y02E 10/58; Y02E 10/56
(Continued)

(56) References Cited

U.S. PATENT DOCUMENTS 8,295,989 B2   10/2012  Rettger et al.
2009/0189445 A1  7/2009  Strizki
(Continued)

FOREIGN PATENT DOCUMENTS

CN    202188424 U    4/2012
CN    205265606 U    5/2016

OTHER PUBLICATIONS

Mardavij Roozbehani et al., "Volatility of Power Grids under Real-Time Pricing", IEEE Transactions on Power Systems, 2012, 15 pages, IEEE Digital Library.

*Primary Examiner* — Richard Tan
(74) *Attorney, Agent, or Firm* — Ference & Associates LLC

(57) ABSTRACT

One embodiment provides a method, including: receiving information, from at least one energy subsystem, indicating a desired amount of photovoltaic output to be produced by at least one photovoltaic panel, wherein the at least one photovoltaic panel comprises at least one photovoltaic harvester; ascertaining the amount of photovoltaic output being produced by the at least one photovoltaic panel; determining the difference between the desired amount of photovoltaic output and the amount of photovoltaic output being produced; identifying the maximum possible amount of photovoltaic output that could be produced by the at least one photovoltaic panel; and optimizing, using an optimization technique, the amount of photovoltaic output produced by the at least one photovoltaic harvester by adjusting at least one characteristic of the at least one photovoltaic harvester, wherein the adjusting comprises: if the difference is less than the maximum possible amount, adjusting at least one characteristic of the at least one photovoltaic harvester to produce the desired amount of photovoltaic output; and if the difference is more than the maximum possible amount, adjusting at least one characteristic of the at least one
(Continued)

photovoltaic harvester to produce the maximum possible amount of photovoltaic output.

16 Claims, 5 Drawing Sheets

(51) Int. Cl.
    *H02J 3/38*     (2006.01)
    *H02J 3/46*     (2006.01)
    *H02S 20/32*     (2014.01)
    *H02S 50/00*     (2014.01)
    *H02S 40/22*     (2014.01)

(58) Field of Classification Search
    USPC .......................................................... 307/84
    See application file for complete search history.

(56) References Cited

U.S. PATENT DOCUMENTS

| | | |
|---|---|---|
| 2010/0145532 A1 | 6/2010 | Gregory et al. |
| 2012/0133333 A1* | 5/2012 | Morioka ............. H01M 10/441 |
| | | 320/134 |
| 2014/0360555 A1* | 12/2014 | Kim ...................... H02S 20/00 |
| | | 136/246 |
| 2015/0244310 A1 | 8/2015 | Singer et al. |
| 2016/0336897 A1* | 11/2016 | Yang ....................... H02S 20/30 |
| 2017/0222597 A1* | 8/2017 | Behrens .................. H02S 10/40 |
| 2017/0257061 A1 | 9/2017 | Chandan et al. |

* cited by examiner

DYNAMIC PHOTOVOLTAIC ADAPTION FOR MANAGING GRID VOLATILITY USING A PHOTOVOLTAIC HARVESTER

BACKGROUND

The world has significant energy needs. Energy is used to power everything from clocks and mobile devices to cars and buildings. Some energy needs are met through the use of energy storage devices, for example, batteries, accumulators, and the like. Other energy needs are met through the use of produced energy which is then directed to the power grid accessible by different energy consumers (e.g., homes, businesses, facilities, etc.). The energy needs for the energy consumers varies throughout the day and night, and energy needs may be greater or less than what the power grid can provide. The energy providers adjust to this difference in demand by either increasing or by reducing the energy supplied to the power grid. One way to increase/reduce the energy supplied to the grid is to increase/decrease the amount of energy produced by energy producers (e.g., non-renewable energy power plants, renewable energy power producers, etc.).

During the day and night, the demand for energy can fluctuate, sometimes very quickly. Accordingly, the power plants are divided into base load power plants and peak load power plants. Base load power plants generally maintain a constant energy output that satisfies a minimum amount of energy demand. Typically base load power plants are plants that have a constant energy supply, for example, nuclear power plants, coal power plants, and the like. The peak load power plants generally supply energy when there is a high demand for energy. Thus, peak load power plants are energy producers that are able to be stopped and started quickly. Additionally, power plants which do not have a constant energy supply (e.g., solar power, wind power, etc.) are typically used as peak load power plants, rather than base load power plants.

BRIEF SUMMARY

In summary, one aspect of the invention provides a method for dynamically stabilizing an amount of photovoltaic output produced by at least one photovoltaic harvester, comprising: utilizing at least one processor to execute computer code that performs the steps of: receiving information, from at least one energy subsystem, indicating a desired amount of photovoltaic output to be produced by at least one photovoltaic panel, wherein the at least one photovoltaic panel comprises at least one photovoltaic harvester; ascertaining the amount of photovoltaic output being produced by the at least one photovoltaic panel; determining the difference between the desired amount of photovoltaic output and the amount of photovoltaic output being produced; identifying the maximum possible amount of photovoltaic output that could be produced by the at least one photovoltaic panel; and optimizing, using an optimization technique, the amount of photovoltaic output produced by the at least one photovoltaic harvester by adjusting at least one characteristic of the at least one photovoltaic harvester, wherein the adjusting comprises: if the difference is less than the maximum possible amount, adjusting at least one characteristic of the at least one photovoltaic harvester to produce the desired amount of photovoltaic output; and if the difference is more than the maximum possible amount, adjusting at least one characteristic of the at least one photovoltaic harvester to produce the maximum possible amount of photovoltaic output.

Another aspect of the invention provides an apparatus for dynamically stabilizing an amount of photovoltaic output produced by at least one photovoltaic harvester, comprising: at least one processor; and a computer readable storage medium having computer readable program code embodied therewith and executable by the at least one processor, the computer readable program code comprising: computer readable program code that receives information, from at least one energy subsystem, indicating a desired amount of photovoltaic output to be produced by at least one photovoltaic panel, wherein the at least one photovoltaic panel comprises at least one photovoltaic harvester; computer readable program code that ascertains the amount of photovoltaic output being produced by the at least one photovoltaic panel; computer readable program code that determines the difference between the desired amount of photovoltaic output and the amount of photovoltaic output being produced; computer readable program code that identifies the maximum possible amount of photovoltaic output that could be produced by the at least one photovoltaic panel; and computer readable program code that optimizes, using an optimization technique, the amount of photovoltaic output produced by the at least one photovoltaic harvester by adjusting at least one characteristic of the at least one photovoltaic harvester, wherein the adjusting comprises: if the difference is less than the maximum possible amount, adjusting at least one characteristic of the at least one photovoltaic harvester to produce the desired amount of photovoltaic output; and if the difference is more than the maximum possible amount, adjusting at least one characteristic of the at least one photovoltaic harvester to produce the maximum possible amount of photovoltaic output.

An additional aspect of the invention provides a computer program product for dynamically stabilizing an amount of photovoltaic output produced by at least one photovoltaic harvester, comprising: a computer readable storage medium having computer readable program code embodied therewith, the computer readable program code executable by a processor and comprising: computer readable program code that receives information, from at least one energy subsystem, indicating a desired amount of photovoltaic output to be produced by at least one photovoltaic panel, wherein the at least one photovoltaic panel comprises at least one photovoltaic harvester; computer readable program code that ascertains the amount of photovoltaic output being produced by the at least one photovoltaic panel; computer readable program code that determines the difference between the desired amount of photovoltaic output and the amount of photovoltaic output being produced; computer readable program code that identifies the maximum possible amount of photovoltaic output that could be produced by the at least one photovoltaic panel; and computer readable program code that optimizes, using an optimization technique, the amount of photovoltaic output produced by the at least one photovoltaic harvester by adjusting at least one characteristic of the at least one photovoltaic harvester, wherein the adjusting comprises: if the difference is less than the maximum possible amount, adjusting at least one characteristic of the at least one photovoltaic harvester to produce the desired amount of photovoltaic output; and if the difference is more than the maximum possible amount, adjusting at least one characteristic of the at least one photovoltaic harvester to produce the maximum possible amount of photovoltaic output.

A further aspect of the invention provides a method for dynamically stabilizing an amount of photovoltaic output produced by at least one photovoltaic harvester, comprising: utilizing at least one processor to execute computer code that performs the steps of: receiving information, from at least one energy subsystem, indicating a desired amount of photovoltaic output yield to be produced by at least one photovoltaic panel comprising at least one photovoltaic harvester; identifying the maximum amount of photovoltaic output yield that can be produced by the at least one photovoltaic panel; and optimizing, using an optimization technique, the amount of photovoltaic output produced by the at least one photovoltaic harvester by modifying at least one of the tilt, the size, and the orientation of the photovoltaic harvester to produce a yield of photovoltaic output, wherein the yield of photovoltaic output is selected from the group consisting of: the maximum amount of photovoltaic output yield and the desired amount of photovoltaic output yield.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
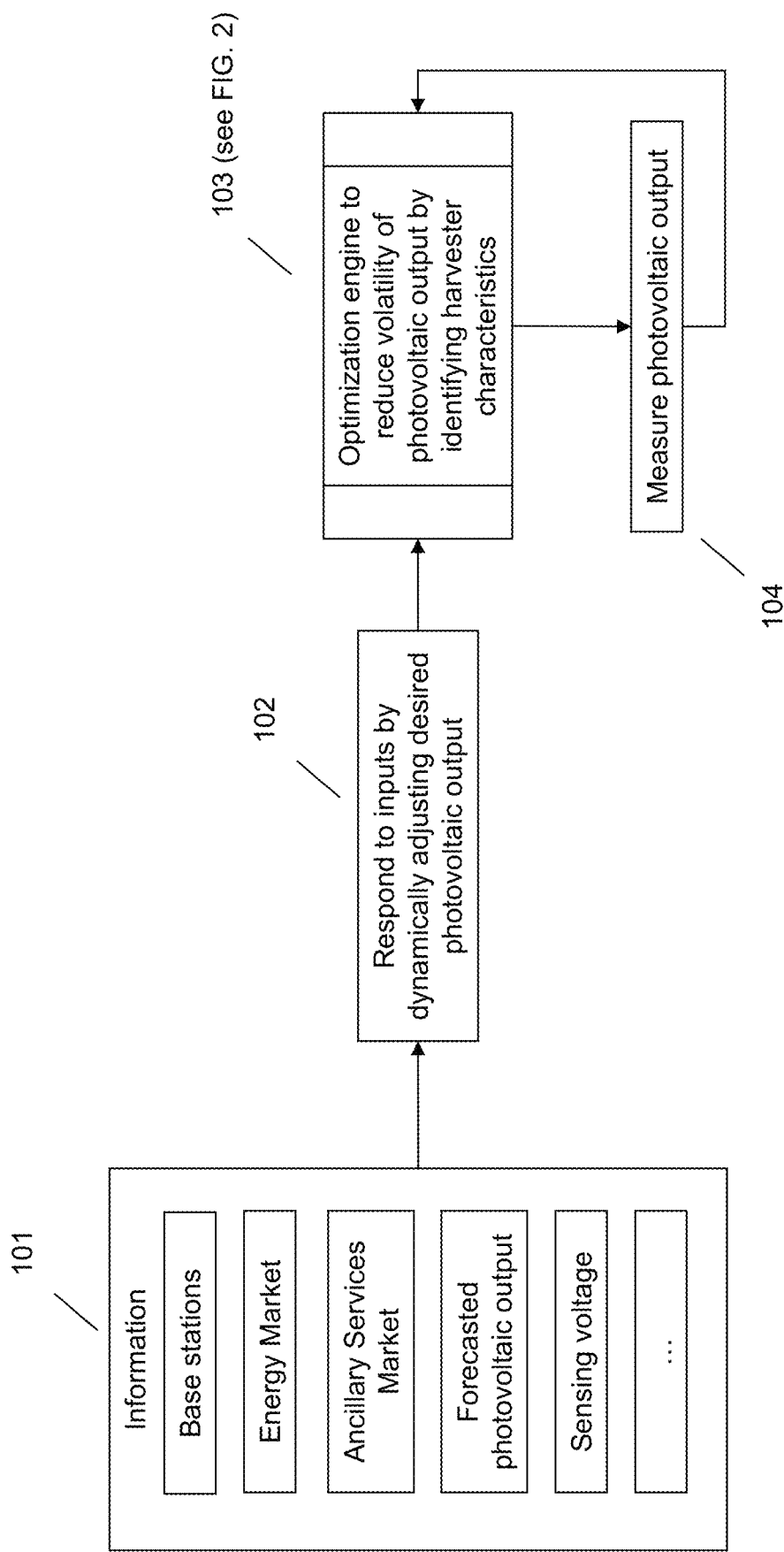
FIG. 1 illustrates a method of dynamically adjusting photovoltaic output based upon inputs.
Figure 2:
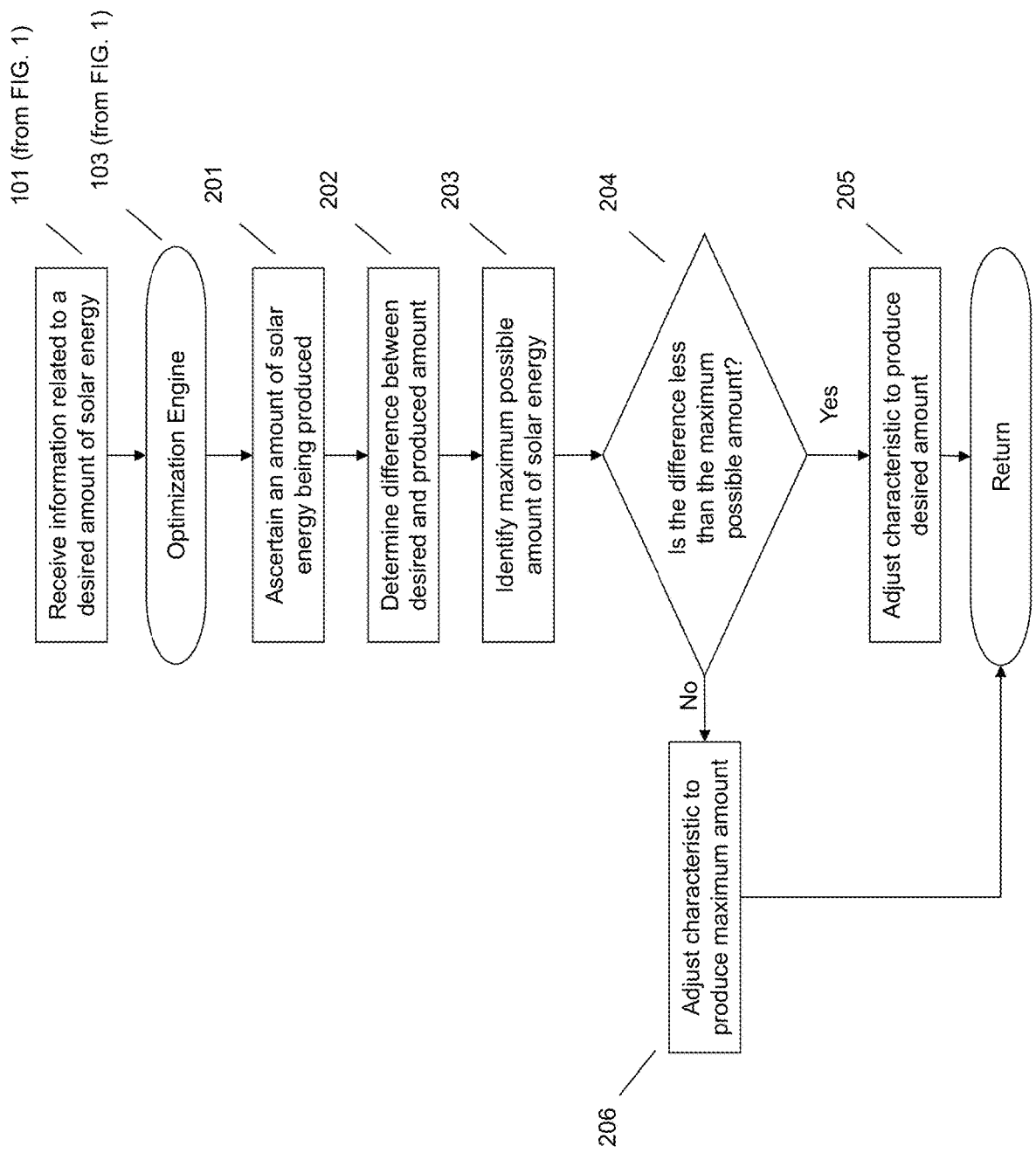
FIG. 2 illustrates a method of optimizing a photovoltaic harvester to reduce volatility of photovoltaic output.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

The increase in a desire to decrease the carbon footprint and decrease pollution, especially as produced by energy generation facilities, has made renewable energy sources (e.g., wind, water, solar, etc.) crucial. Particularly, renewable energy sources (e.g., wind, water, solar, etc.) are widely regarded as being important to the future of energy generation. However, due to the instability and volatility of some renewable energy sources the power plants using those energy sources may only be used to assist in meeting peak demand loads. Additionally, to assist in handling the volatility of renewable energy sources, the power generated by such a facility may be curtailed even though the power generation facility may be able to provide more power. Accordingly, unless a sudden decrease in power supplied by the facility results in an amount of power that is less than the curtailed amount, the power grid will not be affected. However, curtailing the energy generated by the facility results in wasted energy. In many systems, the energy that is produced over the curtailed amount is wasted.

Since the production of solar energy is directly dependent on the amount of sunlight, a solar energy system may experience sharp and quick increases and decreases in the amount of energy that can be generated. For example, photovoltaic output may drop by 80% within a few seconds. Such sudden and dramatic increases and decreases can impact the electromechanical dynamics of the system which may create severe frequency oscillations. This may lead to malfunctions of the protections systems and may trigger cascading failures or massive blackouts.

A solar energy generation system may also suffer from mid-term volatility where the solar photovoltaic output may change over the course of a few minutes to a few hours. For example, the photovoltaic output may change due to cloud movements or temporary shadow effects. For example, during cloud cover the sunlight received by the photovoltaic panels is dramatically reduced as compared to when there is no cloud cover. Additionally, the amount of sunlight received by the photovoltaic panels varies throughout the day due to the different angles at which the sunlight hits the photovoltaic panels. At different angles the sun hits the photovoltaic panels less directly and therefore the amount of irradiance received by the surface of the photovoltaic panel varies. (Irradiance is the radiant flux, or power, received by a surface per unit area.) Each photovoltaic panel has an optimal angle and orientation that most efficiently utilizes the irradiance. However, this angle and orientation vary as the sun angle varies throughout the day. The mid-term volatility impacts the load following capability of the grid and increases the required spinning reserve capacity. It can also create huge power swings in the grid which may lead to voltage collapse.

A solar energy generation system may also suffer from long term volatility. The amount of sunlight that will be available, and thus the amount of photovoltaic output that is possible, can be difficult to predict. Since energy providers need to bid in real time as well as for future generation (e.g., a day ahead, a week ahead, etc.), it can be difficult to accurately predict the amount of photovoltaic output that will be produced by the facility. If the energy generation facility is unable to meet the bid commitment, the facility may need to pay high penalties.

A current method for compensating for the volatility of photovoltaic output is by including grid scale energy storage at the solar energy power generation facility. When the solar energy facility is generating more power than is being used by the grid, the extra power may be stored at the energy storage system. When the solar energy facility is not able to provide the amount of energy demanded by or promised to the power grid, the energy stored in the energy storage system may be used to supplement the energy produced by the solar energy facility. However, grid scale energy storage is very expensive and, thus, is not economically viable.

Accordingly, an embodiment provides a method of dynamically adjusting one or more reflectors attached to one or more photovoltaic panels to dynamically change the amount of energy produced by the photovoltaic panel(s). Such a system allows modular level management of the photovoltaic volatility during a very short time scale (e.g., seconds, minutes, etc.). Thus the system provides dynamic stability to the photovoltaic system by increasing the stability margin of the system. Thus, the energy generation facility is better positioned to participate in the energy and ancillary markets in a more cost and energy efficient manner. To accomplish this, an embodiment may receive information related to a desired amount of photovoltaic output to be produced by at least one photovoltaic panel which has at least one reflector attached to it. The information may include a demand by the power grid, an amount bid by the solar energy generation facility, the real time market, peer-peer energy transfers, and the like. An embodiment may determine how much power is being generated by the photovoltaic panel. If there is a difference between the amount demanded and the amount being produced, the system may identify the maximum possible amount of photovoltaic output that could be produced by the photovoltaic panel. In identifying the maximum possible amount of photovoltaic output that can be produced by the photovoltaic panel, the system may identify the optimal angle for the photovoltaic harvester to generate the maximum possible photovoltaic output. The system may also identify the optimal reflector size to generate the maximum possible photovoltaic output.

If the desired amount of photovoltaic output is less than the maximum possible amount that can be produced by the photovoltaic panel, the system may adjust at least one characteristic of the photovoltaic harvester to cause the photovoltaic panel to produce the desired amount of photovoltaic output. This may include either increasing or decreasing the amount of photovoltaic output that is produced by the photovoltaic panel. For example, if the desired amount of output is less than what is currently being produced by the panel, the system may adjust the harvester to produce less output. If, however, the desired amount of output is greater than what is currently being produced, the system may adjust the harvester to produce more output, up to the maximum possible amount that can be produced by the panel. Thus, if the desired amount of photovoltaic output is more than the maximum possible amount that can be produced by the photovoltaic panel, the system may adjust the photovoltaic harvester to cause the photovoltaic panel to produce the maximum possible amount of photovoltaic output. The characteristics of the photovoltaic harvester that may be adjusted are the size, tilt or angle, direction, and orientation of the photovoltaic harvester. By adjusting these characteristics, the system can cause more or less sunlight to hit the photovoltaic panel, which in turn causes more or less power generation by the photovoltaic panel.

To adjust the characteristics the system may send instructions or signals to motors attached to the photovoltaic harvesters which cause the photovoltaic harvester to move to the desired position. Since the amount of time needed to move the photovoltaic harvesters is very quick, the photovoltaic harvesters can be moved dynamically throughout the day as the sun moves and can be responsive during very short time frames (e.g., seconds, minutes, etc.). Accordingly, the system provides a method and system which can ensure that the sun hitting the photovoltaic harvester is always at the optimal angle for maximum power generation. Additionally, if less power is demanded by the system, the reflector can be adjusted so that less power is being generated by the photovoltaic panel, which reduces the amount of wasted energy generated by the solar energy generation facility.

Such a system provides a technical improvement over current systems for compensating for solar system volatility. Using the techniques and systems described herein, the photovoltaic harvesters, which assist in reflecting sunlight onto the photovoltaic panel, can be adjusted to boost the amount of energy produced by the photovoltaic panels. The change in power generated by the panel, can be effectuated in a very short time frame, which results in a system which can be dynamically modified as solar irradiance increases and decreases and also as power demands increase and decrease. The tilt angle, size, and orientation of the reflectors can be adjusted to optimally reflect the sun light onto the photovoltaic panel, thereby allowing for maximum energy production by the photovoltaic panel. Additionally, the systems and methods as described herein not only provide for techniques to boost photovoltaic output when needed, but also provide for techniques to curtail energy production. Accordingly, rather than wasting produced energy, the photovoltaic harvesters can be adjusted to produce less photovoltaic output. Thus, the amount of energy produced by the photovoltaic panel is more consistent and can be adjusted to meet the demand required by the power grid without the need for expensive energy storage systems. The system uses a multi-objective optimization to adjust the photovoltaic harvesters to maximize revenue by ensuring maximum power yield using a system which reduces the volatility of the entire system.

Referring now to FIG. 1, at 101, an embodiment may receive information related to a desired amount of photovoltaic output to be produced by at least one photovoltaic panel. The system may receive the information from at least one energy subsystem. For example, the system may receive the information or input as a direct input by an operator of the solar energy facility, or the system may receive the information from an external energy system, for example, the power grid, energy market, base stations, ancillary services market, forecasted photovoltaic output, sensing voltage, and the like. The information received by the system may include information related to a demand by the power grid. For example, as energy demand from energy consumers increases, the energy demand to be provided by the power grid increases. The energy demand can be sensed through voltage and frequency sensing of the power grid. The energy demand may also be identified through direct input from the power grid or a power grid operator. For example, a power grid operator may request more energy production.

Information related to a desired amount may also be identified from a bid made by the power generation facility. For example, solar energy generation facilities may make bids indicating how much energy will be provided by the solar facility. These bids may be made both in real-time and hours or days ahead of when the energy will be requested. If the bids cannot be met by the energy facility, the energy facility may be required to pay high penalties for failing to meet the promised amount of energy. Other types of information indicating a desired amount of photovoltaic output are contemplated and possible. For example, the solar facility may artificially increase the demand for photovoltaic output from the photovoltaic panels. For example, if the solar system includes an energy storage device, the solar facility may want to increase production from the photovoltaic panels to replenish or fill the energy storage device(s). For example, the solar facility may know that the amount of sunlight that is going to be available over the next day is going to be low, so the facility may want to store some excess energy to compensate for the decrease in solar energy production that is going to occur. Accordingly, the system coupled with good irradiance prediction models is a valuable asset to control the volatility of the photovoltaic system.

Figures 3A, 3B:
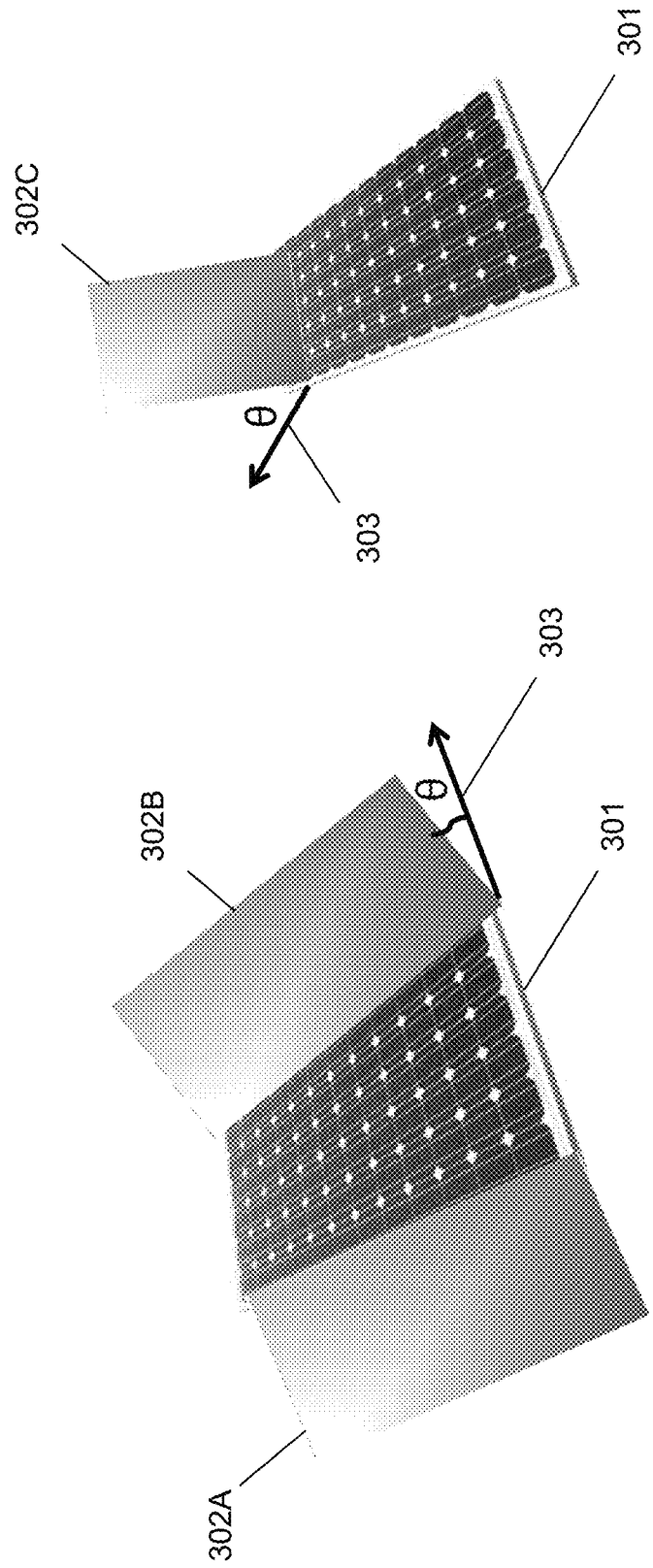
FIGS. 3A-3B illustrate example photovoltaic panels including photovoltaic harvesters.
Figure 4:
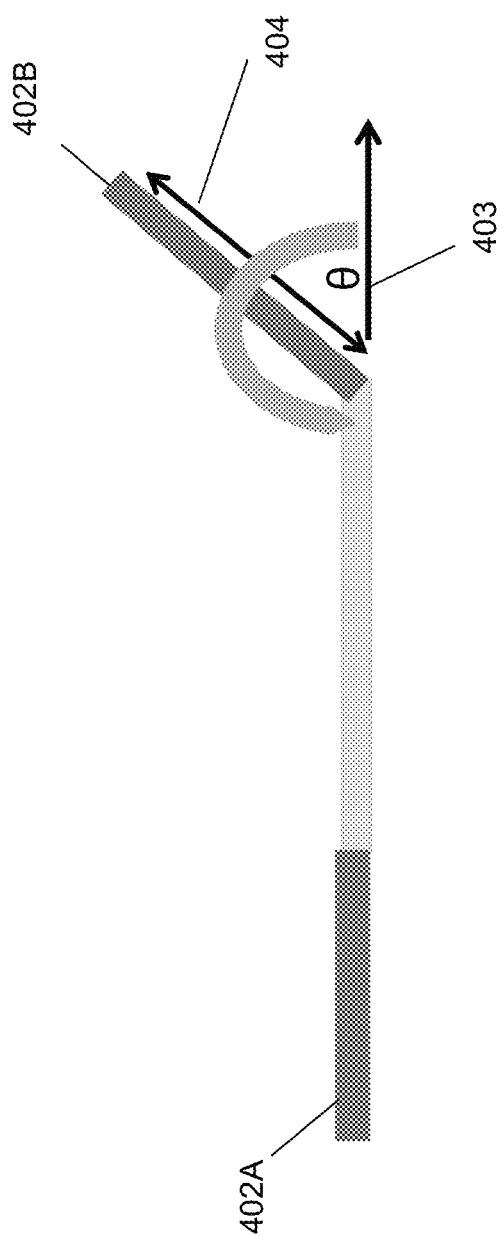
FIG. 4 illustrates a side view of an example photovoltaic panel including photovoltaic harvesters.

The at least one photovoltaic panel may be a single photovoltaic panel or part of a larger conglomeration of photovoltaic panels, for example, at a solar power generation facility. Each of the photovoltaic panels may have at least one photovoltaic harvester attached to the panel. For example, referring to FIGS. 3A and 3B, the photovoltaic panel 301 may include one or more photovoltaic harvesters 302A-302C. FIG. 3A illustrates east/west photovoltaic harvesters 302A and 302B. FIG. 3B illustrates a north photovoltaic harvester 302C. The photovoltaic harvesters 302A-302C may assist in directing sunlight onto the photovoltaic panel 301. As can be understood, as the tilt or angle 303 of the photovoltaic harvester is changed, the angle that the sunlight hits the photovoltaic panel changes, which increases or decreases the irradiance received by the photovoltaic panel. FIG. 4 illustrates a side view of east/west photovoltaic harvesters 402A and 402B. As described, the tilt or angle 403 may be changed. Also, the size of the harvester may change by increasing or decreasing the length 404 of the harvester 402A and/or 402B. Similarly, as the size or orientation of the reflector changes, the amount of irradiance received by the photovoltaic panel increases or decreases. Accordingly, the energy yield of the photovoltaic panel increases and decreases with the increase or decrease in irradiance. The optimum tilt, size, and orientation of the reflector, to provide the maximum irradiance to the photovoltaic panel, changes throughout the day and across the year as the sun and earth move.

At 102 an embodiment may respond to the information or inputs received at 101 by dynamically adjusting the photovoltaic output reference. To assist in reducing the volatility commonly associated with solar power generation, an optimization engine may adjust the photovoltaic output of the photovoltaic harvesters to respond to the desired photovoltaic output. To adjust the photovoltaic output, the optimization engine may identify photovoltaic harvester characteristics and cause adjustment of one or more of the characteristics to produce the desired output amount or a maximum output amount, as described in FIG. 2. The optimization engine may use one or more multi-objective optimization techniques to determine an optimal adjustment of the photovoltaic harvester. A multi-objective optimization technique may include maximizing the amount of revenue generated using the constraints of the photovoltaic harvesters. For example, the harvester characteristics can only be adjusted to a maximum angle, size, value, and the like. To maximize the amount of revenue, the system may take into account the profit prices, penalty prices, revenue generated from participation in the energy markets (e.g., ancillary services market, base energy market, etc.), committed power values, maximum output of the photovoltaic system, and the like. To assist in maximizing the revenue, the system may identify the maximum production that can be produced by the system with the least amount of volatility. Thus, the system may not run at maximum production at all times to ensure that the system can account for any volatility caused by reduction in solar irradiance.

At 201 an embodiment may ascertain an amount of photovoltaic output currently being produced by the photovoltaic panel(s). To ascertain the amount of photovoltaic output currently being produced by the panel, the system may identify an amount of irradiance onto the photovoltaic panel over a predetermined length of time. The system may determine the direct and global irradiance for a given time as a function of the solar declination (azimuth) angle and elevation angle using equations for determining such. Example equations follow:

$$\text{Elevation angle: } h = \frac{\pi}{2} - \theta_0$$

$$\text{Declination angle: } \sin\delta(N) =$$

$$0.398\sin\left\{\frac{2\pi}{365}\left[N - 82 + 2\sin\frac{2\pi(N-2)}{365}\right]\right\}$$

$$\text{Direct irradiation: } H_d = 0 \text{ if } \cos i < 0$$

$$H_d = H_{dn}\cos i \text{ if } \cos i > 0 (i < 90°)$$

-continued $$\cos i = \cos\theta_0\cos\theta_p + \sin\theta_0\sin\theta_p\cos(\varphi_0 - \varphi_p) =$$
$$\sin h\cos\theta_p + \cos h\sin\theta_p\cos(\varphi_0 - \varphi_p)$$

The system may then determine the solar irradiance onto the panel for a predetermined length of time based upon the size and orientation of the reflector. The solar power, current, and voltage produced by the photovoltaic panel can then be determined using the determined irradiance onto the panel.

At 202 an embodiment may determine the difference between the desired amount of photovoltaic output received at 101 and the amount of output that is currently being produced by one or more photovoltaic panels ascertained at 201. The difference may be determined simply by subtracting the produced amount from the desired amount. In one embodiment, the desired amount of energy may be less than the amount of energy currently being produced. In other words, the desired amount of energy may actually be a reduction in the amount of energy that is currently being produced by the photovoltaic panel(s). The systems and methods as described herein can also react to this reduction in energy demand.

At 203, an embodiment may determine the maximum amount of photovoltaic output that can be produced by the photovoltaic panel(s). Based upon the orientation, maximum size, and maximum angle of the reflector, the amount of irradiance onto the photovoltaic panel can only be increased so much. The point of maximum irradiance is the point that maximum photovoltaic output would be produced by the photovoltaic panel. Accordingly, an embodiment may determine the optimal angle of the photovoltaic harvester to provide the maximum possible irradiance onto the panel, and, thus, the maximum possible power generation. The optimal angle is a function of the reflector geometry and orientation of the reflector. Additionally, the optimal angle is based upon the irradiance of the sun, which, as discussed above, is function of the sun's declination and elevation angles. Similarly, an optimal reflector size can be calculated for generating the maximum possible power or energy yield. Additionally, the optimum orientation of the photovoltaic harvester may be identified. The orientation may include the reflector being an east/west reflector, for example, as shown in FIG. 3A, or a north reflector, for example, as shown in FIG. 3B. Depending on the angle of the sunlight, the output generated by the photovoltaic panel may be increased or decreased based upon this orientation of the photovoltaic harvester.

At 204 an embodiment may determine if the difference between the desired amount of output and the produced amount of output as determined at 202 is less than the maximum possible amount of output that can be produced by the photovoltaic panel identified at 203. Based upon this determination, the system may adjust characteristics of the photovoltaic harvester accordingly. The characteristics that can be adjusted by the system include the tilt, size, and orientation of the photovoltaic harvester with respect to the photovoltaic panel.

Modifying the characteristics (e.g., tilt, size, orientation, etc.) of the photovoltaic harvester may be done using devices attached to the photovoltaic harvester. For example, the photovoltaic harvester may be moved using motors, hydraulic pumps, cables, and the like. Adjusting the tilt of the photovoltaic panel can be accomplished by moving the surface of the photovoltaic harvester toward or away from the surface of the photovoltaic panel, for example, by adjusting the tilt angle 303 as shown in FIG. 3. Modifying the size of the reflector may be accomplished by moving the reflector down, up, sideways, and the like, with respect to the photovoltaic panel, for example, as shown in FIG. 4, thereby causing more or less of the reflector to be exposed to the sunlight. Alternatively, the position of the photovoltaic harvester may be moved over the photovoltaic panel to cover part of the photovoltaic panel (e.g., the underneath of the photovoltaic harvester moves over the topside of the photovoltaic panel, etc.). In other words, rather than directly modifying the size of the reflector, the size of the panel may be modified which indirectly modifies the size of the reflector.

If the difference is more than the maximum possible amount, the system may adjust the characteristics of photovoltaic harvester to produce the maximum possible amount at 206. In other words, the system may adjust the photovoltaic harvester to the optimal angle, optimal size, and optimal orientation as determined at 203. If the difference is less than the maximum possible amount, the system may adjust the characteristics of the photovoltaic harvester to produce the desired amount of photovoltaic output at 205. The optimal angle to produce the desired amount of photovoltaic output may be determined using the same method as determining the maximum possible amount of output that can be produced by the photovoltaic panel. The angles may be calculated for different ranges of available power. For example, optimal angles may be calculated for 50% maximum power, 25% maximum power, 5%-10% maximum power, a specific power value, and the like. Similarly, the optimal reflector size to produce the desired yield of solar power may be calculated for the different ranges of available power. In one embodiment, the system may first determine the optimal angle and adjust the photovoltaic harvester to this optimal angle. If the desired output level is not met, the system may then adjust the size of the reflector. In the case where the desired energy level is less than the currently produced output level, the same techniques can be used to curtail the output produced by the photovoltaic panel.

The system may measure the photovoltaic output at 104. The adjustment of the photovoltaic harvester can be accomplished relatively quickly. Therefore, as solar conditions or desired photovoltaic outputs, as based upon the input information, change throughout the day, the photovoltaic harvesters can be dynamically adjusted to compensate for the condition changes. The measured photovoltaic output can be compared against the desired photovoltaic output to cause the dynamic adjustment of the photovoltaic harvesters. Thus, the systems and methods as described herein, result in a less volatile and more consistent energy output by the solar energy generation facility. For example, as the sunlight to the panel is less direct during early and late hours, the use of the photovoltaic harvesters and ability to adjust them may result in significant energy generation gains as compared to using photovoltaic panels without the adjustable reflectors. Additionally, the photovoltaic harvesters can be dynamically adjusted based upon different energy demands from internal or external systems (e.g., ancillary services markets, energy markets, base stations, grid frequency sensing, etc.). Accordingly, the solar power generation facility can quickly adjust to assist in meeting fluctuating peak load energy demands and reduce volatility of the solar power generation.

Figure 5:
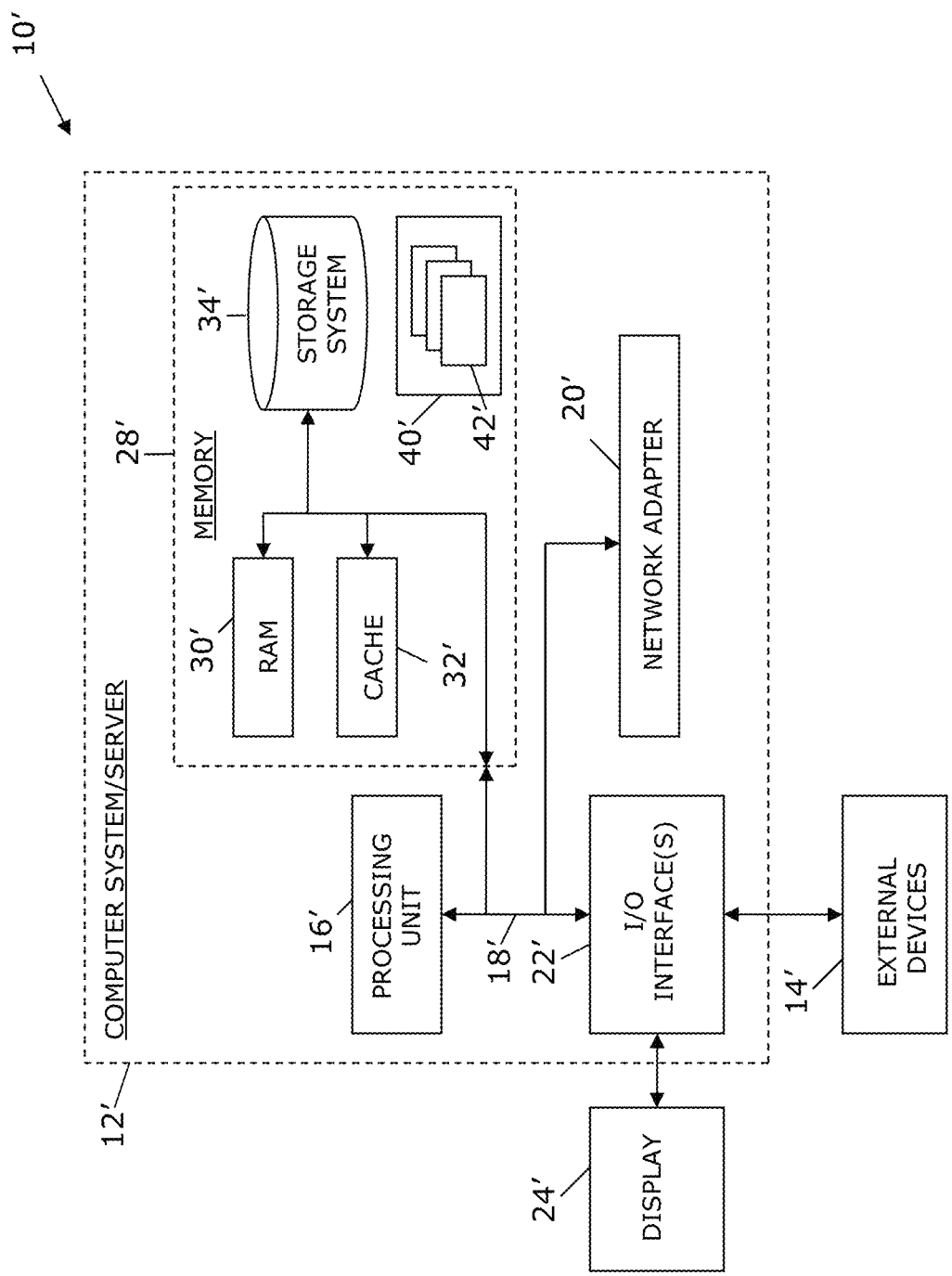
FIG. 5 illustrates a computer system.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for dynamically stabilizing an amount of photovoltaic output produced by at least one photovoltaic panel, comprising:
   utilizing at least one processor to execute computer code that performs the steps of:
   receiving information, from at least one energy subsystem, indicating a desired amount of photovoltaic output to be produced by the at least one photovoltaic panel, the at least one photovoltaic panel having at least one photovoltaic harvester attached thereto, wherein the at least one photovoltaic harvester is at least one reflector;
   ascertaining the amount of photovoltaic output being produced by the at least one photovoltaic panel, wherein the ascertaining comprises identifying an amount of solar irradiance onto the photovoltaic panel over a predetermined length of time based upon a size and orientation of the at least one photovoltaic harvester with respect to the at least one photovoltaic panel;
   determining a difference between the desired amount of photovoltaic output and the amount of photovoltaic output being produced;
   identifying a maximum possible amount of photovoltaic output that could be produced by the at least one photovoltaic panel, wherein the maximum possible amount of photovoltaic output corresponds to a maximum irradiance onto the at least one photovoltaic panel; and
   optimizing, using an optimization technique that determines an optimal adjustment of the photovoltaic harvester, the amount of photovoltaic output produced by the at least one photovoltaic panel by adjusting at least one characteristic of the at least one photovoltaic harvester, wherein the at least one characteristic comprises a size of the at least one photovoltaic harvester with respect to the at least one photovoltaic panel, wherein the optimizing comprises maximizing an amount of revenue generated from the at least one photovoltaic panel in view of the maximum possible amount of photovoltaic output that could be produced by the at least one photovoltaic panel, a maximum angle of the at least one photovoltaic harvester with respect to the at least one photovoltaic panel, and a maximum size of the at least one photovoltaic harvester and wherein the optimizing comprises performing the maximizing with a least amount of volatility, thereby not running the at least one photovoltaic panel at maximum production at all times;
   wherein the adjusting the size of the at least one photovoltaic harvester comprises changing a length of the at least one photovoltaic harvester by moving, utilizing a mechanical component, the at least one photovoltaic harvester in a direction with respect to the at least one photovoltaic panel.

2. The method of claim 1, wherein the adjusting at least one characteristic comprises adjusting the angle of the at least one photovoltaic harvester with respect to the at least one photovoltaic panel.

3. The method of claim 1, wherein the adjusting at least one characteristic comprises adjusting the orientation of the at least one photovoltaic harvester with respect to the at least one photovoltaic panel.

4. The method of claim 1, wherein the desired amount of photovoltaic output comprises the amount of photovoltaic output less than the amount of photovoltaic output being produced.

5. The method of claim 4, wherein the adjusting at least one characteristic comprises adjusting at least one characteristic to curtail the amount of photovoltaic output being produced.

6. The method of claim 1, wherein the identifying the maximum possible amount of photovoltaic output comprises determining an optimal angle of the at least one photovoltaic harvester to produce the most photovoltaic output.

7. The method of claim 1, wherein the identifying the maximum possible amount of photovoltaic output comprises determining an optimal size of the at least one photovoltaic harvester to produce the most photovoltaic output.

8. The method of claim 1, wherein the optimizing comprises identifying an optimal photovoltaic output, wherein the optimal photovoltaic output comprises the photovoltaic output having maximum revenue with the least photovoltaic output volatility.

9. An apparatus for dynamically stabilizing an amount of photovoltaic output produced by at least one photovoltaic panel, comprising:
at least one processor; and
a non-transitory computer readable storage medium having computer readable program code embodied therewith and executable by the at least one processor, the computer readable program code comprising:
computer readable program code that receives information, from at least one energy subsystem, indicating a desired amount of photovoltaic output to be produced by the at least one photovoltaic panel, the at least one photovoltaic panel having at least one photovoltaic harvester attached thereto, wherein the at least one photovoltaic harvester is at least one reflector;
computer readable program code that ascertains the amount of photovoltaic output being produced by the at least one photovoltaic panel, wherein the ascertaining comprises identifying an amount of solar irradiance onto the photovoltaic panel over a predetermined length of time based upon a size and orientation of the at least one photovoltaic harvester with respect to the at least one photovoltaic panel;
computer readable program code that determines a difference between the desired amount of photovoltaic output and the amount of photovoltaic output being produced;
computer readable program code that identifies a maximum possible amount of photovoltaic output that could be produced by the at least one photovoltaic panel, wherein the maximum possible amount of photovoltaic output corresponds to a maximum irradiance onto the at least one photovoltaic panel; and
computer readable program code that optimizes, using an optimization technique that determines an optimal adjustment of the photovoltaic harvester, the amount of photovoltaic output produced by the at least one photovoltaic panel by adjusting at least one characteristic of the at least one photovoltaic harvester, wherein the at least one characteristic comprises a size of the at least one photovoltaic harvester with respect to the at least one photovoltaic panel, wherein the optimizing comprises maximizing an amount of revenue generated from the at least one photovoltaic panel in view of the maximum possible amount of photovoltaic output that could be produced by the at least one photovoltaic panel, a maximum angle of the at least one photovoltaic harvester with respect to the at least one photovoltaic panel, and a maximum size of the at least one photovoltaic harvester and wherein the optimizing comprises performing the maximizing with a least amount of volatility, thereby not running the at least one photovoltaic panel at maximum production at all times;
wherein the adjusting the size of the at least one photovoltaic harvester comprises changing a length of the at least one photovoltaic harvester by moving, utilizing a mechanical component, the at least one photovoltaic harvester in a direction with respect to the at least one photovoltaic panel.

10. A computer program product for dynamically stabilizing an amount of photovoltaic output produced by at least one photovoltaic panel, comprising:
a non-transitory computer readable storage medium having computer readable program code embodied therewith, the computer readable program code executable by a processor and comprising:
computer readable program code that receives information, from at least one energy subsystem, indicating a desired amount of photovoltaic output to be produced by the at least one photovoltaic panel, the at least one photovoltaic panel having at least one photovoltaic harvester attached thereto, wherein the at least one photovoltaic harvester is at least one reflector;
computer readable program code that ascertains the amount of photovoltaic output being produced by the at least one photovoltaic panel, wherein the ascertaining comprises identifying an amount of solar irradiance onto the photovoltaic panel over a predetermined length of time based upon a size and orientation of the at least one photovoltaic harvester with respect to the at least one photovoltaic panel;
computer readable program code that determines a difference between the desired amount of photovoltaic output and the amount of photovoltaic output being produced;
computer readable program code that identifies a maximum possible amount of photovoltaic output that could be produced by the at least one photovoltaic panel, wherein the maximum possible amount of photovoltaic output corresponds to a maximum irradiance onto the at least one photovoltaic panel; and
computer readable program code that optimizes, using an optimization technique that determines an optimal adjustment of the photovoltaic harvester, the amount of photovoltaic output produced by the at least one photovoltaic panel by adjusting at least one characteristic of the at least one photovoltaic harvester, wherein the at least one characteristic comprises a size of the at least one photovoltaic harvester with respect to the at least one photovoltaic panel, wherein the optimizing comprises maximizing an amount of revenue generated from the at least one photovoltaic panel in view of the maximum possible amount of photovoltaic output that could be produced by the at least one photovoltaic panel, a maximum angle of the at least one photovoltaic harvester with respect to the at least one photovoltaic panel, and a maximum size of the at least one photovoltaic harvester and wherein the optimizing comprises performing the maximizing with a least amount of volatility, thereby not running the at least one photovoltaic panel at maximum production at all times;

wherein the adjusting the size of the at least one photovoltaic harvester comprises changing a length of the at least one photovoltaic harvester by moving, utilizing a mechanical component, the at least one photovoltaic harvester in a direction with respect to the at least one photovoltaic panel.

11. The computer program product of claim 10, wherein the adjusting at least one characteristic comprises adjusting the angle of the at least one photovoltaic harvester with respect to the at least one photovoltaic panel.

12. The computer program product of claim 10, wherein the adjusting at least one characteristic comprises adjusting the orientation of the at least one photovoltaic harvester with respect to the at least one photovoltaic panel.

13. The computer program product of claim 10, wherein the desired amount of photovoltaic output comprises an amount of photovoltaic output less than the amount of photovoltaic output being produced and wherein the adjusting at least one characteristic comprises adjusting at least one characteristic to curtail the amount of photovoltaic output being produced.

14. The computer program product of claim 10, wherein the identifying the maximum possible amount of photovoltaic output comprises determining an optimal angle of the at least one photovoltaic harvester to produce the most photovoltaic output.

15. The computer program product of claim 10, wherein the identifying the maximum possible amount of photovoltaic output comprises determining an optimal size of the at least one photovoltaic harvester to produce the most photovoltaic output.

16. A method for dynamically stabilizing an amount of photovoltaic output produced by at least one photovoltaic panel, comprising:

utilizing at least one processor to execute computer code that performs the steps of:

receiving information, from at least one energy subsystem, indicating a desired amount of photovoltaic output yield to be produced by the at least one photovoltaic panel, wherein the at least one photovoltaic panel has at least one photovoltaic harvester attached thereto, the at least one photovoltaic harvester being at least one reflector;

identifying a maximum amount of photovoltaic output yield that can be produced by the at least one photovoltaic panel, wherein the maximum amount of photovoltaic output corresponds to a maximum irradiance onto the at least one photovoltaic panel; and optimizing, using an optimization technique, the amount of photovoltaic output produced by the at least one photovoltaic panel by modifying at least a size of the photovoltaic harvester with respect to the at least one photovoltaic panel to produce a yield of photovoltaic output, wherein the optimizing comprises maximizing an amount of revenue generated from the at least one photovoltaic panel in view of the maximum possible amount of photovoltaic output that could be produced by the at least one photovoltaic panel, a maximum angle of the at least one photovoltaic harvester with respect to the at least one photovoltaic panel, and a maximum size of the at least one photovoltaic harvester and wherein the optimizing comprises performing the maximizing with a least amount of volatility, thereby not running the at least one photovoltaic panel at maximum production at all times;

wherein the modifying the size of the at least one photovoltaic harvester comprises changing a length of the at least one photovoltaic harvester by moving, utilizing a mechanical component, the at least one photovoltaic harvester in a direction with respect to the at least one photovoltaic panel.

* * * * *